US012795309B2

(12) United States Patent
Narampanawe et al.

(10) Patent No.: US 12,795,309 B2
(45) Date of Patent: Nov. 10, 2026

(54) ENHANCED DESIGN BATTERY COIL MODULE, HEARING INSTRUMENT AND METHOD FOR MANUFACTURING THE BATTERY COIL MODULE

(71) Applicant: Sivantos Pte. Ltd., Singapore (SG)

(72) Inventors: Nishshanka Bandara Narampanawe, Singapore (SG); Heng Goh Yap, Singapore (SG); Gee Heng Ler, Georgetown (MY); Yong Kiat Ng, Singapore (SG); Chee Kong Siew, Singapore (SG); Pascal Schreiber, Dietenheim (DE)

(73) Assignee: Sivantos Pte. Ltd., Singapore (SG)

( * ) Notice: Subject to any disclaimer, the term of this patent is extended or adjusted under 35 U.S.C. 154(b) by 264 days.

(21) Appl. No.: 18/588,936

(22) Filed: Feb. 27, 2024

(65) Prior Publication Data

US 2024/0205620 A1 Jun. 20, 2024

Related U.S. Application Data

(63) Continuation of application No. PCT/EP2022/070308, filed on Jul. 20, 2022.

(30) Foreign Application Priority Data

Aug. 30, 2021 (SG) .......................... 10202109494W

(51) Int. Cl.

| | |
|---|---|
| ***H04R 25/00*** | (2006.01) |
| ***H02J 50/00*** | (2016.01) |
| ***H02J 50/12*** | (2016.01) |
| *H01M 50/583* | (2021.01) |

(52) U.S. Cl.

CPC .......... *H04R 25/602* (2013.01); *H02J 50/005* (2020.01); *H04R 25/609* (2019.05); *H01M 50/583* (2021.01); *H01M 2200/103* (2013.01); *H02J 50/12* (2016.02); *H04R 2225/31* (2013.01)

(58) Field of Classification Search

CPC .... H02J 50/005; H02J 2225/31; H02J 25/602; H02J 25/609

See application file for complete search history.

(56) References Cited

U.S. PATENT DOCUMENTS

| | | | | |
|---|---|---|---|---|
| 9,726,518 | B2 * | 8/2017 | Widmer | B60L 3/003 |
| 10,536,788 | B2 | 1/2020 | Nikles et al. | |
| 11,659,339 | B2 | 5/2023 | Narampanawe et al. | |
| 2003/0048095 | A1 | 3/2003 | Zink et al. | |
| 2017/0213644 | A1 * | 7/2017 | Lee | H01F 27/2871 |
| 2021/0337319 | A1 * | 10/2021 | Narampanawe | H02J 50/005 |

FOREIGN PATENT DOCUMENTS

| | | | | |
|---|---|---|---|---|
| DE | 19837909 | A1 * | 2/2000 | H01M 50/583 |
| DE | 102017219973 | A1 | 9/2018 | |
| DE | 102020205157 | A1 | 10/2021 | |
| EP | 3413587 | A1 | 12/2018 | |
| JP | 2015533273 | A | 11/2015 | |

* cited by examiner

*Primary Examiner* — Sunita Joshi

(74) *Attorney, Agent, or Firm* — Laurence A. Greenberg; Werner H. Stemer; Ralph E. Locher

(57) ABSTRACT

A battery coil module, in particular for a hearing instrument, contains two battery polarity terminals for contacting the battery poles of a secondary battery, a fuse, a ferrite element, a receiver coil, a resonance capacitor and a temperature sensor for sensing the temperature close to the secondary battery and a module ring. In addition, the battery coil module can be used in a hearing instrument.

16 Claims, 12 Drawing Sheets

ENHANCED DESIGN BATTERY COIL MODULE, HEARING INSTRUMENT AND METHOD FOR MANUFACTURING THE BATTERY COIL MODULE

CROSS-REFERENCE TO RELATED APPLICATION

This application is a continuation, under 35 U.S.C. § 120, of copending International Patent Application PCT/EP2022/070308, filed Jul. 20, 2022, which designated the United States; this application also claims the priority, under 35 U.S.C. § 119, of Singaporean Patent Application SG 10202109494 W, filed Aug. 30, 2021; the prior applications are herewith incorporated by reference in their entirety.

FIELD AND BACKGROUND OF THE INVENTION

The invention concerns a battery coil module, in particular for a hearing instrument, as well as such a hearing instrument and respective methods for manufacturing such a battery coil module and hearing instrument. The invention also concerns a particular technical design choice for the battery coil module.

Hearing devices are typically used to output an audio signal to the sense of hearing of the wearer of this hearing device. The output takes place by means of an output transducer, usually acoustically via airborne sound by means of a loudspeaker (also referred to as a "receiver"). Such hearing devices are frequently used as so-called hearing aid devices (also for short: hearing aids), which are used for the treatment of a person having a hearing loss. For this purpose, the hearing devices normally contain an acoustic input transducer (in particular a microphone) and a signal processor, which is configured to process the input signal (also: microphone signal) generated by the input transducer from the ambient sound with application of at least one signal processing algorithm typically stored in a user-specific manner in such a way that the hearing loss of the wearer of the hearing device is at least partially compensated for. In particular in the case of a hearing aid device, the output transducer can be, in addition to a loudspeaker, alternatively also a so-called bone vibrator or a cochlear implant, which are configured to mechanically or electrically couple the audio signal into the sense of hearing of the wearer. The term "hearing device," as used herein, also includes in particular so-called tinnitus maskers, headsets, headphones, and the like.

In the meantime, rechargeable energy accumulators (in particular in the form of secondary cells, also referred to as "accumulators") have been used more and more to supply power to the electronic components of the hearing device. It is fundamentally conceivable to replace conventional battery formats with identical-format secondary cells. However, since the latter usually output other voltage values, a converter electronics unit for voltage conversion to the voltage values required by the electronic components is generally necessary, so that solely an exchange is usually not possible. Moreover, it needs to be possible to recharge the secondary cells even without removing them from the corresponding hearing device, in order to increase the usage convenience. Since hearing devices, in particular hearing aid devices, are generally worn on the body and are thus subjected to bodily fluids, in particular sweat, wireless charging is additionally desirable. In this way the housing of the hearing device can be made particularly leak-tight.

Wireless charging typically takes place by means of an inductive charging coil which is coupled wirelessly, specifically inductively, in charging operation to a transmission coil arranged in a charging device. In this case, however—possibly in addition to the above-described converter electronics unit (if the electronic components are not adapted with respect to their operating voltage value to the output voltage of the secondary cell)—a charging electronics unit is required for controlling the (cell-side) charging procedure. This is usually combined jointly with the secondary cell to form a "battery module."

For inductive charging, a comparatively precise arrangement of the charging coil in relation to the transmission coil is required. Furthermore, the two coils also have to be arranged at a comparatively short distance from one another (usually in the range of approximately 3 millimeters). Otherwise, the possible energy yield during the energy transfer is impaired, which results in long charging cycles or even in inadequate or at worst impossible charging of the secondary coil. In particular, in the case of hearing devices to be worn in the ear (in particular in the case of so-called "in the ear hearing aid devices", also referred to for short as ITE—for "in the ear"), such a precise or close arrangement in relation to one another is usually not possible, however, for example due to frequently individually adapted housings.

Published, non-prosecuted German patent application DE 10 2020 205 157 A1 discloses a battery cell module and a hearing module for wireless charging, the battery module includes:

- a secondary cell having a positive potential and a negative potential;
- two contact elements, including a contact element for making contact with the positive potential of the secondary cell and a contact element for making contact with the negative potential of the secondary cell;
- a fuse arranged in close vicinity of the contact element for making contact with the positive potential;
- a copper jacket surrounding said secondary cell;
- a ferrite jacket arranged on an outside of the copper jacket;
- a receiver coil arranged on an outside of the ferrite jacket, the receiver coil being configured to inductively receive energy;
- a resonant capacitor connected to the receiver coil in close vicinity of the receiver coil; and
- a thermistor for monitoring a cell temperature, the thermistor being electrically insulated with respect to the secondary cell but thermally coupled to the secondary cell with low thermal resistance for heat transfer between the secondary cell and the thermistor. The ferrite jacket might be either in the form of an inherently stable injection-molded component or may be formed from a comparatively flexible or pliable film material.

However, the tolerance of inductance of a battery coil module is always the primary concern for mass production. A widely spread inductance tolerance value could cause the adopted capacitor with the same value for all the mass-produced battery coil modules resulting in a widespread resonance frequency range. A higher concentration of the resonance frequency for the mass-produced battery coil module can result in the devices with mass-produced have a higher concentration of resonance frequency when the battery coil modules are integrated into the device in the production. A device with a resonance frequency closer to the target resonance frequency which is the same as the transmitter resonance frequency would have an improved reception of the transferred power. As such, a widespread tolerance resonance frequency range for the mass-produced battery coil module could cause many devices to have a wide range of resonance frequencies. Thus, probably some of the devices have a resonance frequency that is out of range. The out-of-range resonance frequency devices have difficulties receiving the transferred wireless power, which might scarify the charging distance, tilt angle of device placement to the transmitter, or make the device incapable of charging. Besides inductance tolerance control, the quality factor of the battery coil module is another major factor in receiving transmitted power from the charger. The quality factor determines the charging efficiency and received power. Hence, any enhancement to the quality factor of the battery coil module in the design perspective is always desired. Overall, a narrow inductance tolerance and a high-quality factor can ensure that the battery coil module is able to receive the transferred power when it is integrated into a hearing instrument.

SUMMARY OF THE INVENTION

It is accordingly an object of the invention to provide an enhanced design battery coil module that overcomes the above-mentioned disadvantages of the prior art devices and methods of this general type. More specifically, the objectives of the present invention include, in particular, providing an improved hearing instrument and providing an improved battery coil module for a hearing instrument as well as providing methods for producing the same. further objectives can be derived from the following text.

One or several objectives are solved by the subject matter as claimed in the claims and as described in the following text. Further solutions and preferred embodiments are described in the following text as well.

According to the invention a battery coil module includes:

- two battery polarity terminals for contacting the battery poles of a secondary battery,
- a fuse,
- ferrite element,
- a receiver coil,
- a resonance capacitor, and
- a temperature sensor for sensing the temperature close to the secondary battery.

Preferably, the battery coil module further contains a diode and smoothing capacitor, both explained in more detail below.

Optionally, the battery coil module further contains one or more of the following components:

- a copper jacket wrapped around the secondary battery for AC resistance reduction and quality factor enhancement, and
- a diode as a rectifier circuit for the energy conversion from the received AC energy to DC energy to feed a charging electronic circuit in a hearing device.

The battery coil module further contains a module ring.

The battery coil module is configured for a rechargeable battery or secondary battery. In the following "battery" is also used for secondary battery.

The battery module according to the invention is preferably configured and provided for use in a hearing device, in particular a hearing aid device (for short: "hearing aid"), preferably an ITE hearing aid device (i.e., a hearing aid device to be worn in the ear, referred to for short as "ITE").

Specifically, the battery coil module according to the invention has two battery polarity terminals for contacting the poles of the secondary battery, which can be included in the battery coil module. The polarity terminals preferably include battery tabs, which are preferably non-magnetized. The utilization of non-magnetized battery tabs reduces the overall resistance of the battery coil module significantly. The reduction of battery coil module resistance results in enhancing the quality factor of the battery coil module. Each battery tab is in particular connected via a terminal connector to a printed circuit board included in the battery coil module.

The receiver coil is a receiver component of a wireless charging system, in particular an inductive charging system. The temperature sensor preferably is a thermistor, thus a temperature dependent resistance. Hence, the thermistor is preferably located close to the ferrite element and the receiver coil.

The battery coil module is provided with a fuse, which is in particular a resettable fuse. The fuse preferably is a self-resetting fuse, which is pitched to a high resistance in case of a short-circuit and regains a low resistance value after a time t after the short circuit has been removed. In particular, the resettable fuse has the feature of turning the resistance to an extremely high value when the current flow is larger than the rated current. In the event of a short circuit, the current drawn from the battery positive terminal to the battery negative terminal is very high and passes through the resettable fuse. The resettable fuse reacts to the high current instantly by changing itself into extremely high resistance. The change of the fuse resistance to extremely high resistance during only a short duration t reduces the damage to the battery from a fast depletion of battery charge. The resettable fuse then restores to a very low resistance after the short circuit is no longer present for some period. The short circuit scenario might happen during the assembly process for integrating the battery coil module to the device, especially during the step of soldering the battery coil module output pads to the motherboard pads of the device via a wire. The short circuit usually happens during just a short duration due to unintentionally touching the battery positive pad and negative pad at the same time.

The battery coil module is provided with a receiver coil, a resonance capacitor and a temperature sensor for sensing the temperature close to the secondary battery. In particular, the battery coil module is provided with two resonance capacitors. The two resonance capacitors are preferably connected both parallel to the receiver coil. The two resonance capacitors in a parallel arrangement to the receiver coil in the enhanced design battery coil module presented here accurately adjusts the resonance frequency of the battery coil module to a target resonance frequency. The target resonance frequency preferably is in any range that complies with one or several standards, e.g., with the Qi standard, such as 110 kHz to 205 kHz or the industrial, scientific and medical (ISM) charging frequency such as 6.78 MHZ, 13.56 MHZ, and 27.12 MHz.

The positioning of the resonance capacitors is preferably close to the receiver coil terminal end to achieve accurate tuning without additional parasitic inductance over the PCB trace and to avoid induced current generating extra heat over the PCB trace with parasitic resistance. The resonance capacitor closer to the receiver coil end is recommended to have a larger value than the resonance capacitor placed further away from the receiver coil, to achieve the result of less current flow over the PCB trace. In addition, the recommended 1% resonance capacitor tolerance helps to reduce the deviation of battery coil module resonance frequency from the target resonance frequency.

The battery coil module preferably is provided with a rectifier circuit, in particular containing additional capacitor, prior to output terminals. The additional capacitor is a smoothing capacitor.

The battery coil module is provided with the ferrite element. The ferrite element can be a hard ferrite or a soft ferrite. The ferrite element preferably is a molded ferrite element, which would be a hard ferrite, or a flexible ferrite sheet. The flexible ferrite sheet preferably is combined with or even a part of a printed circuit board (PCB), in particular of a PCB having a printed coil. In a suitable embodiment, the flexible ferrite sheet and the PCB are separate entities and also made from different materials. The receiver coil, in turn, can be in PCB form instead of using a conventional copper coil or other electro-conductive coil. In the present embodiment a flexible ferrite sheet is preferred.

The battery coil module contains a module ring, as stated above. Preferably, the module ring has the shape of a hollow circle (i.e. is ring-shaped) and/or is made of a plastic material that does not contain any magnetizing composition. Adding the plastic module ring to the battery coil module has the advantage of retaining the flexible ferrite sheet. Additionally, the copper coil always stays at the same position due to the plastic module ring. The plastic module ring is used as the stopper of the flexible ferrite sheet and the copper coil. The plastic module ring is a position reference that ensures the flexible ferrite sheet and receiver coil always staying in the same position for every unit of the battery coil module. In particular the module ring is provided with a recess and/or opening for keeping the ferrite sheet and/or receiver coil in place. Since the plastic module ring can keep the ferrite sheet and copper coil at the same position, it controls the inductance of the battery coil module and keeps a small inductance tolerance variation from one module device to another. In addition, the plastic module ring applied to the enhanced design battery coil module avoids disruption of the whole battery coil module or displacement of parts of the battery coil module when it is dropped on the floor.

In an embodiment, the receiver coil contains a three winding turns receiver coil, i.e. a receiver coil which is wound and thereby has three full windings. The receiver coil is preferably made from a copper material. More winding turns for the receiver coil increase the overall inductance of the battery coil module. However, it will also increase the parasitic resistance over the receiver coil at the same time due to the length of the receiver coil being longer. Since the inductance of the three winding turns receiver coil is larger than the two winding turn receiver coil, the three winding turns receiver coil battery coil module has a lower current flow than the two winding turns receiver coil battery coil module when those battery coil modules are immersed into the same magnetic field. The current flow is a heat generation source, so a higher current flow causes more heat generated and a rising temperature. As a result, a lower current flow for the three winding turns receiver coil battery coil module achieves a lower temperature rising than the two winding turns receiver coil battery coil module when the battery coil module received the transmitted power.

In an embodiment, the battery coil module comprises a copper sheet, which is a metal component that preferably surrounds a battery circumferential surface.

In an embodiment, the battery coil module contains a flexible ferrite sheet, which is the ferrite element that preferably encompasses an outer surface of a copper sheet. The ferrite sheet preferably contains a protruded portion used for insertion to the module ring. The protruded portion is in particular formed for form-locking connection locking with a recess or opening of the module ring. A form-locking connection is a connection that connects two elements together due to the shape of the elements themselves (e.g. ball and socket), as opposed to a force-locking connection, which locks the elements together by force external to the elements (e.g. screw). Furthermore, the ferrite sheet preferably contains an adhesive tape applied to one side of the flexible ferrite sheet for attaching it to the outer surface of the copper sheet.

In an embodiment, the battery coil module comprises a coin cell battery. The coin cell battery is a secondary battery.

According to the invention a hearing instrument, in particular hearing aid, contains the battery coil module as describe throughout this document. Such a hearing instrument contains in particular a casing and a microphone. In a preferred embodiment, the hearing instrument is an ITE hearing instrument.

According to a further aspect of this invention a method for manufacturing a battery coil module and/or hearing instrument is disclosed.

An enhanced design battery coil module is described in this invention disclosure. This invention disclosure shows the structure and dimensions of the enhanced design battery coil module. This invention disclosure includes the detail of each component in the enhanced design battery coil module. Overall, the enhanced design battery coil module has the feature of a well-controlled inductance tolerance and performance enhancement when compared to the previously described design battery coil module.

Other features which are considered as characteristic for the invention are set forth in the appended claims.

Although the invention is illustrated and described herein as embodied in an enhanced design battery coil module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The invention disclosed in this application is an enhanced design battery coil module, i.e., a battery coil module with an enhanced design. The battery coil module is part of a receiver system, which in turn is preferably part of a device, in particular a hearing instrument, preferably a hearing aid. The two main functionalities of the battery coil module are 1) capture the magnetic energy then convert it to electrical energy when it is exposed to the magnetic field and 2) energy storage for receiving power and energy source for supplying power to the device. The present invention focuses on the battery coil module design with two particular objectives being tolerance control and performance enhancement. "Tolerance control" means inductance distribution control and resonance frequency distribution control for the mass-produced battery coil module. "Performance enhancement" is the increment of the battery coil module quality factor.

Figure 1A:
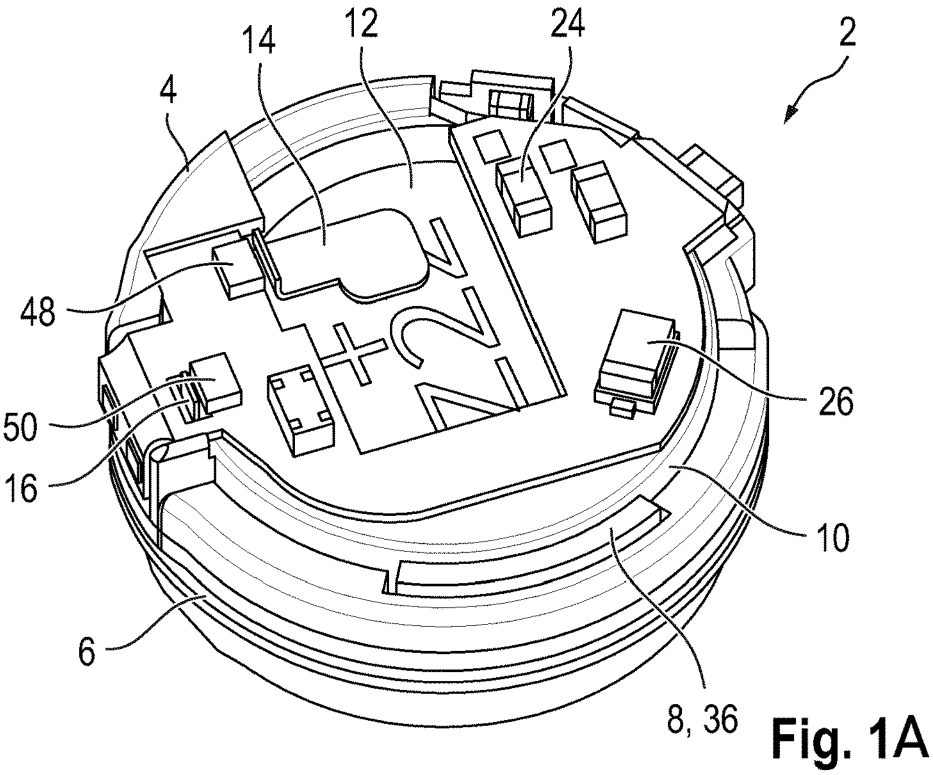
FIG. 1A is a perspective view of an enhanced battery coil module.
Figure 1B:
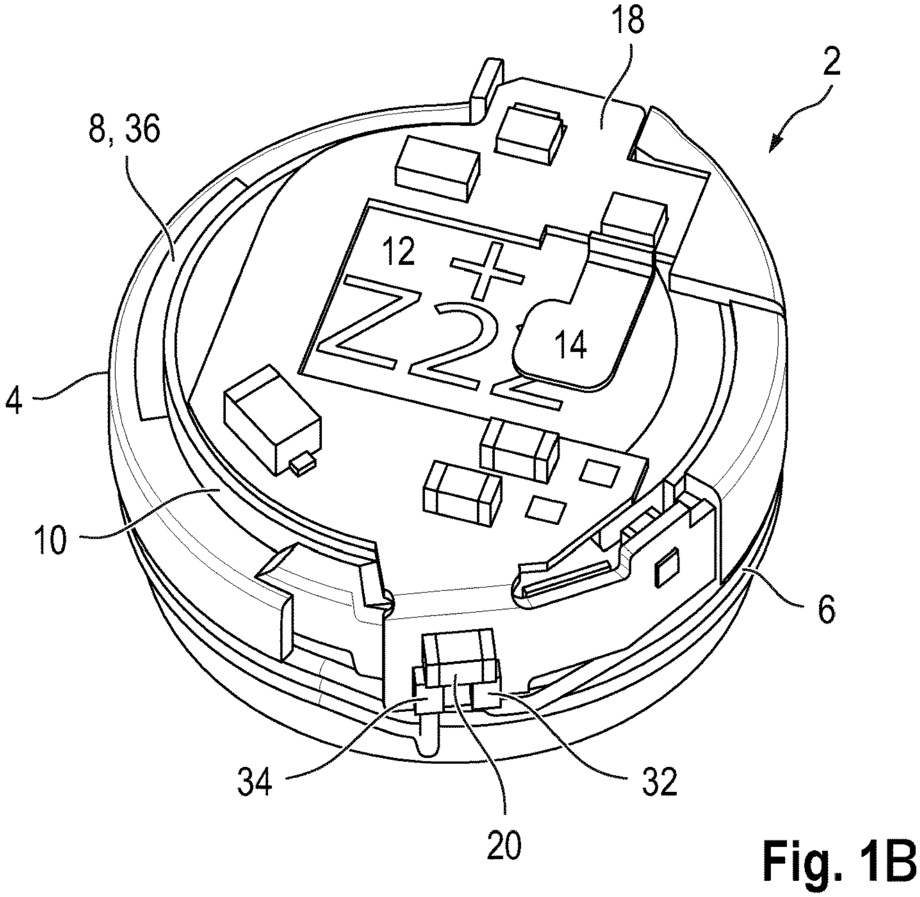
FIG. 1B is a perspective, front view of the enhanced battery coil module.
Figure 1C:
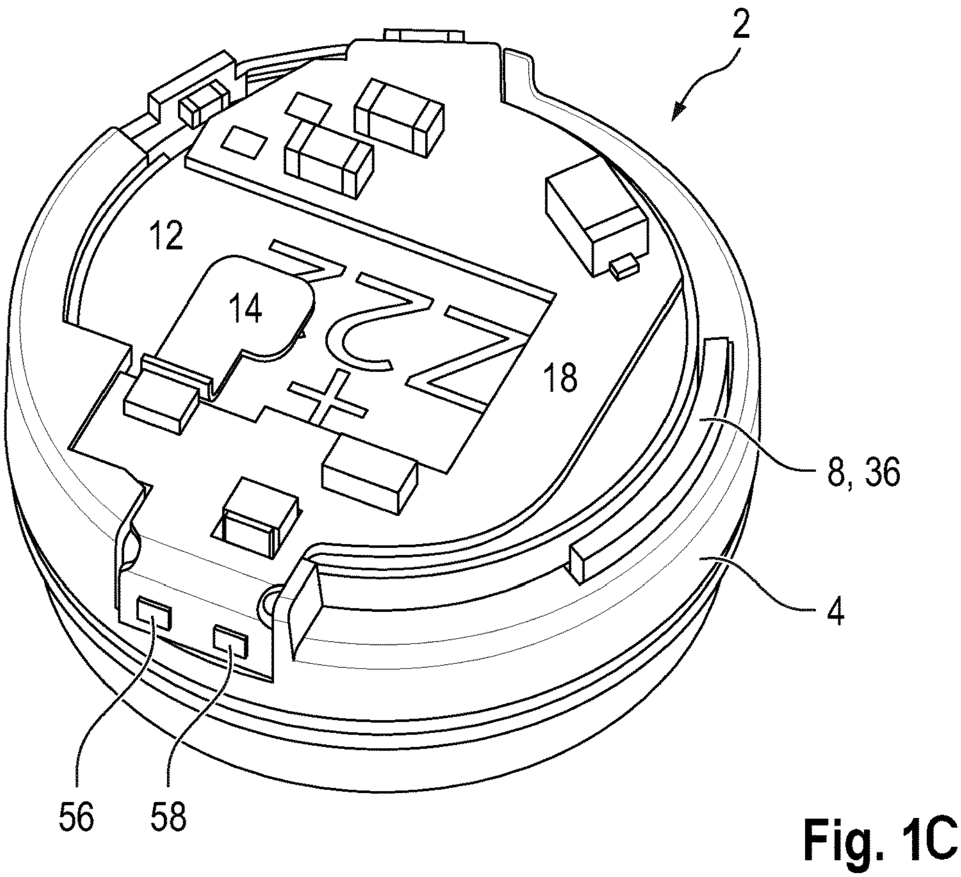
FIG. 1C is a perspective, rear view of the enhanced battery coil module.
Figure 2:
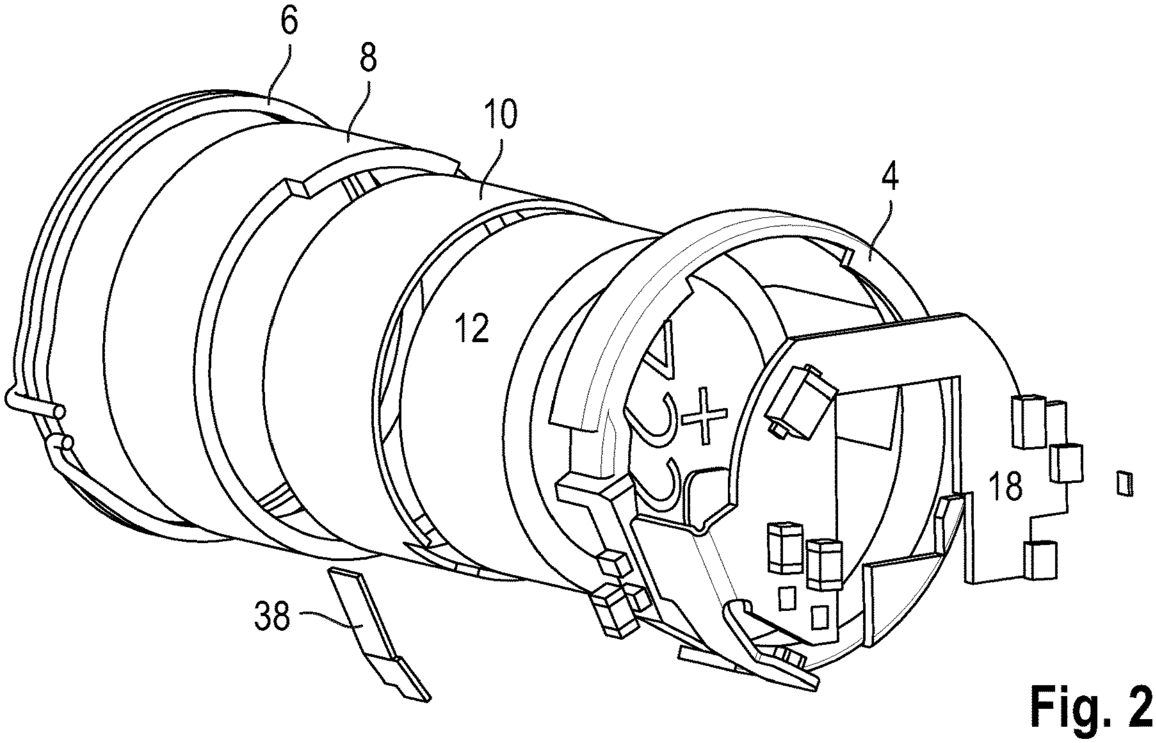
FIG. 2 is an exploded, perspective view of the enhanced battery coil module.

Referring now to the figures of the drawings in detail and first, particularly to FIGS. 1A-1C thereof, there is shown different views of a preferred embodiment of the enhanced design battery coil module 2. FIG. 2 shows an exploded view of the enhanced design battery coil module 2. The enhanced design battery coil module 2 has a plastic module ring 4, a three winding turns copper coil 6, a flexible ferrite sheet 8, a copper sheet 10, a secondary battery 12 with two non-magnetized batteries tabs 14,16, and a flexible printed circuit board 18. The flexible printed circuit board (PCB) 18 of the battery coil module 2 contains two resonance capacitors 20, 22, a smoothing capacitor 24, a diode 26, a resettable fuse 28, and a thermistor 30. Each component in the battery coil module 2 has its function in the receiver system.

Figure 3:
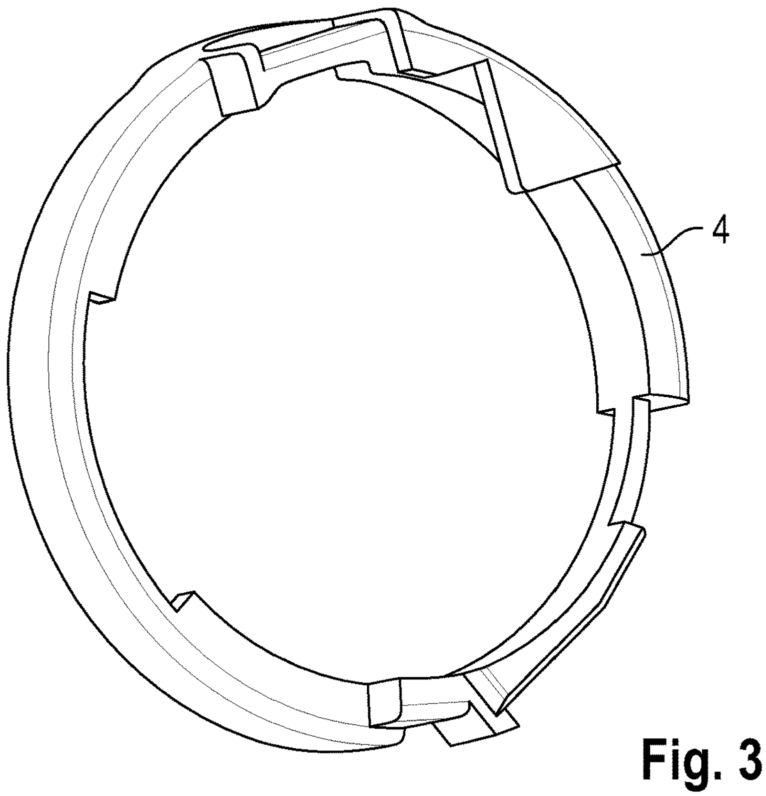
FIG. 3 is a perspective view of a plastic module ring.

The module ring 4 is in a hollow circle shape or ring shape as shown in FIG. 3. The module ring 4 is preferably made of plastic material that does not contain any magnetizing composition. The plastic module ring 4 is used as the holding structure of the battery coil module 2, positioning the PCB 18, and positioning the flexible ferrite sheet 8. In particular the module ring might have a flange portion on the front side with dedicated openings for the PCB and the flexible ferrite sheet 8 to form a form-locking connection.

Figure 4:
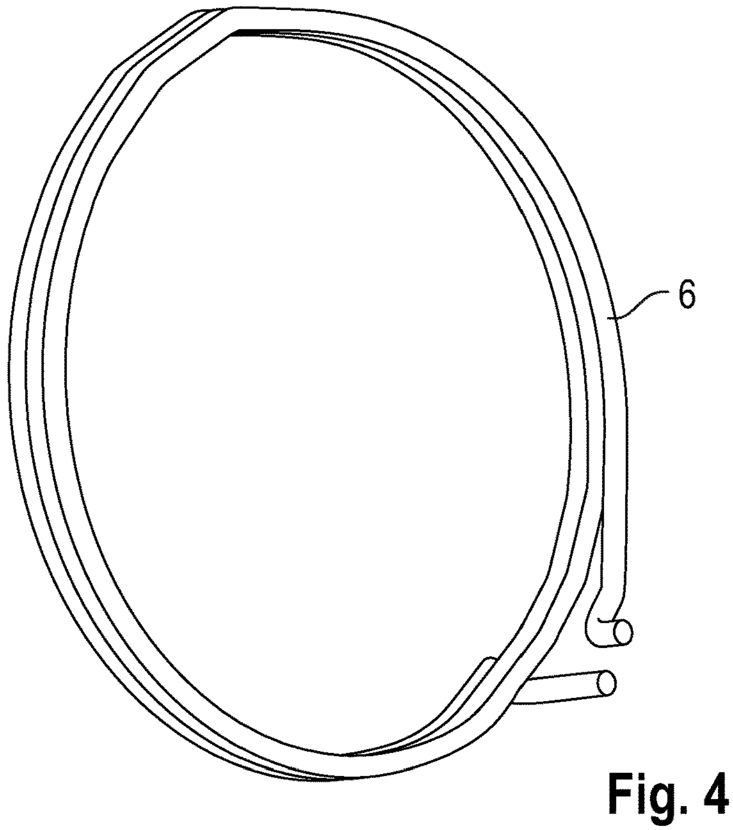
FIG. 4 is a perspective view of a three winding turns receiver coil.

The receiver coil 6 is a receiver component of wireless charging. The receiver coil 6 is preferably made of copper material. The enhanced design battery coil module 2 has preferably three winding turns receiver coil 6 as shown in FIG. 4. The receiver coil 6 encompasses on outer surface the flexible ferrite sheet 8. The terminate connection of the receiver coil 6 is in particular joint to the two edge pads 32, 34 of flexible PCB 18.

Figure 5:
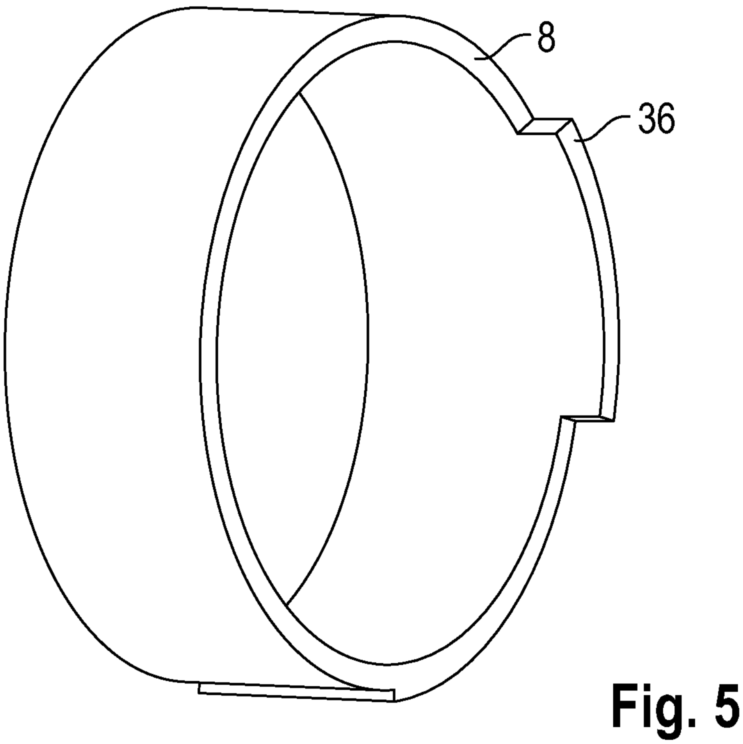
FIG. 5 is a perspective view of a flexible ferrite sheet.

The flexible ferrite sheet 8 as shown in FIG. 5 is a ferrite component that encompasses the outer surface of the copper sheet 10. Thus, the ferrite sheet 8 forms an envelope of the copper sheet 10. The ferrite sheet 8 is used for enhancing the inductance and quality factor of the battery coil module 2. A protruded portion 36 of the flexible ferrite sheet 8 is preferably used as an insertion for the module ring 4 and quality factor enhancement. The insertion of the protruded portion of the ferrite sheet 8 to the module ring 4 fixes the ferrite sheet 8 to always stay in the same position for every battery coil module 2. Furthermore, the protruded portion 36 of the ferrite sheet 8 to the battery coil module can increase the overall quality factor. An adhesive tape 38 is applied to one side of the flexible ferrite sheet 8 for it to attach to the outer surface of the copper sheet 10, as depicted in the exploded view FIG. 2.

Figure 6:
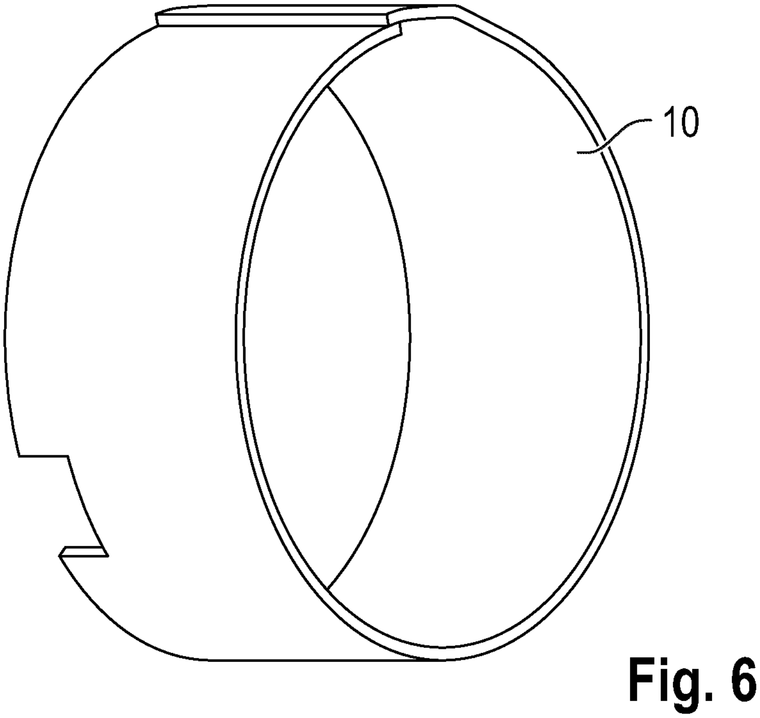
FIG. 6 is a perspective view of a copper sheet.

The preferred copper sheet 10 as shown in FIG. 6 is a metal component that surrounds the battery's circumferential surface. The utilization of a copper sheet 10 facilitates reducing the skin effect and reduces the eddy current flow over the battery surface when the battery coil module 2 is immersed into a magnetic field. A high eddy current is generated at the battery body, if it being made of stainless steel material which has a high relative permeability. The induced eddy current flow over the battery surface, that has high relative permeability, has high dissipation power, which causes a rise of temperature. The copper material that has low relative permeability as a jacket wrap-around battery body can absorb the magnetic field and resist the penetration of the magnetic field toward the battery body. A corrosion proof layer is preferably jacketed to the copper sheet to prevent corrosion to the copper surface when the battery coil module is exposed to a high humidity environment or immersed into water without drying. A second adhesive tape is preferably applied to one side of the copper sheet 10 to attach it to the battery's circumferential surface.

Figure 7:
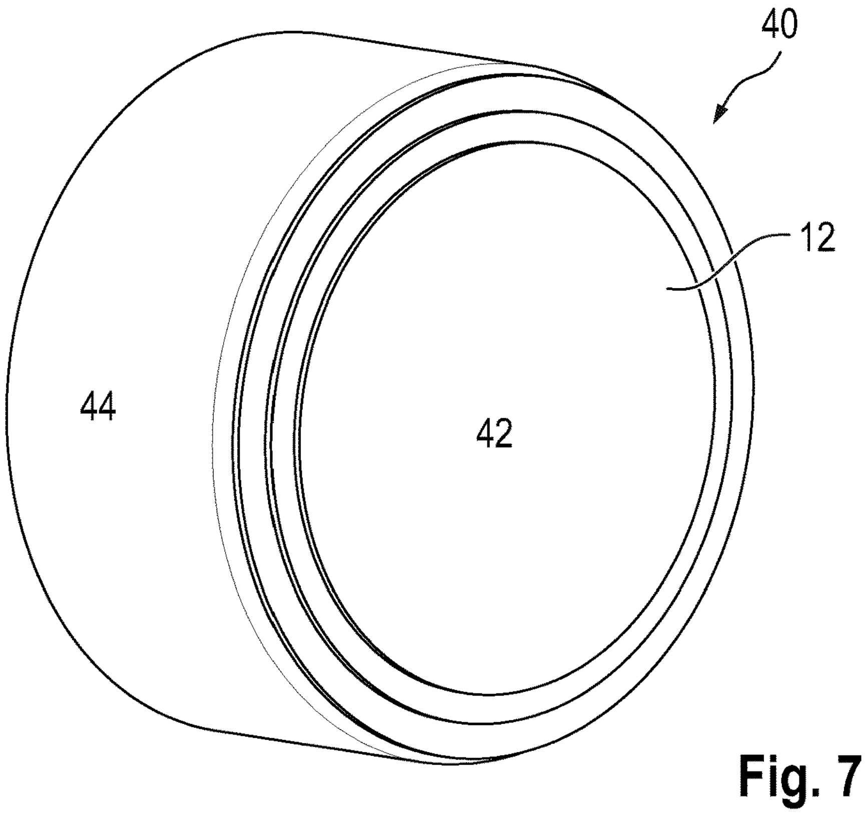
FIG. 7 is a perspective view of a coin cell battery.

The preferred battery or secondary battery 12 as shown in FIG. 7 is an energy storage component and energy supply component of the receiver system. The selected battery type of the embodiment for the enhanced design battery coil module shown here is a button cell. The button cell has a cylindrical shape that has two opposing flat surfaces, a first flat surface 40 and a second flat surface 42 and a bent circumferential surface 44. Due to the large perimeter of the bent circumferential surface 44, the receiver coil 6 has a relatively high inductance. The button cell battery has a structure in which the positive terminal is the first flat surface 40 and the circumferential surface 44, whereas the negative terminal is the second flat surface 42.

Figure 8:
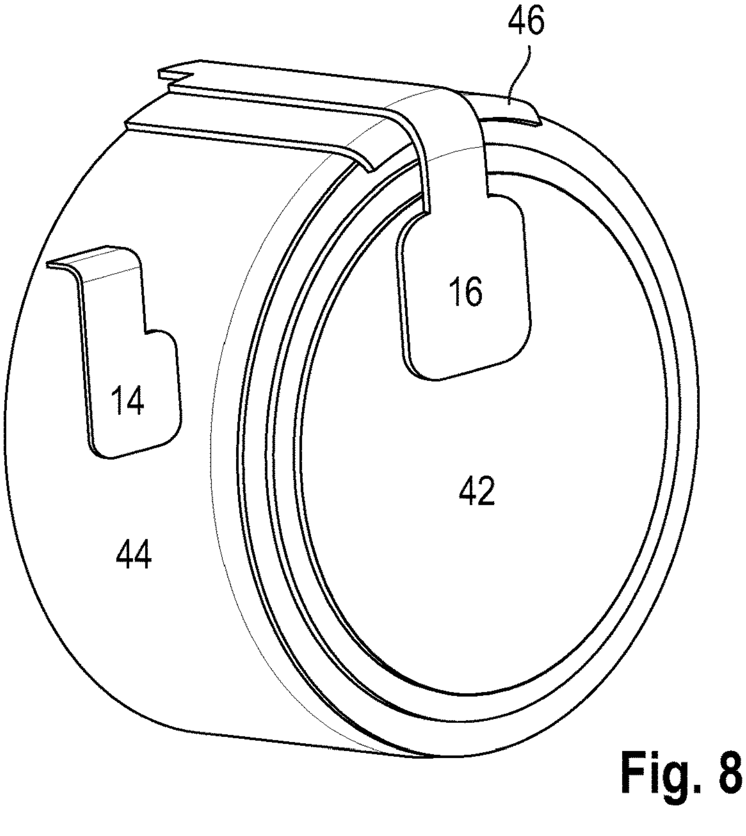
FIG. 8 is a perspective view of battery tabs.

The battery tabs 14,16 as shown in FIG. 8 are the battery polarity terminals, which are normally used for the external connection to the battery. There are two battery tabs 14, 16 in a battery coil module, one termed positive tab 14 and the other negative tab 16. The positive tab 14 is connected to the positive surface, being the first flat surface 40 or the bent circumference surface 44, and positive electrode of the battery. The negative tab 16 is connected to the negative surface and negative electrode of the battery. For the enhanced design battery coil module, both tabs are preferably mounted on each battery polarity flat surface 40, 42. The negative tab 16 extends preferably to the same plane as the positive tab to facilitate the pads' connection of flexible PCB design and achieve a smaller form factor for the battery coil module design. The positive tab 14 is connected to the PCB 18 via terminal connector 48 as shown in FIG. 1A and the negative tab 16 is connected to the PCB 18 via terminal connector 50. As such, the negative tab 16 has to crossover the battery circumferential surface 44 to reach the second flat surface 42 of the battery. An insulation tape 46 such as a polyimide (e.g., Kapton) tape is applied in between the negative tab and part of the circumferential surface 44 to avoid a short circuit happening between the battery positive terminal and negative terminal. The tabs 14, 16 are preferably non-magnetized, when used as the positive tab and negative tab for the enhanced design battery coil module presented here.

Figure 9A:
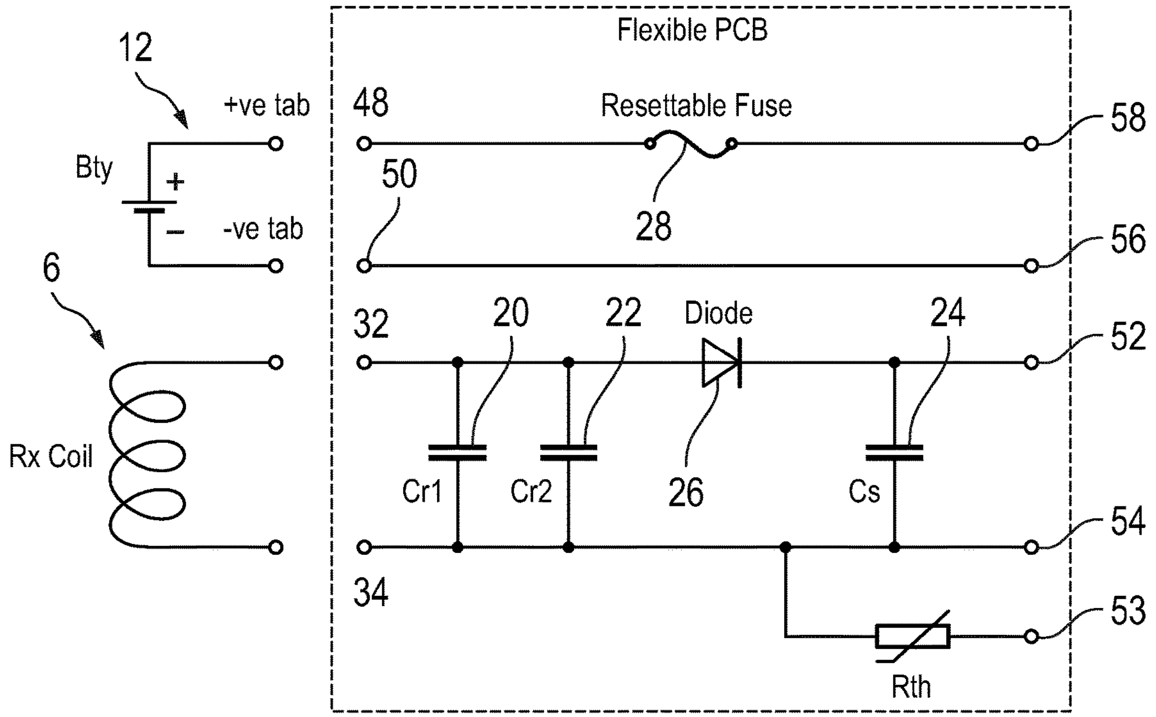
FIG. 9A is a schematic diagram of flexible PCB.
Figure 9B:
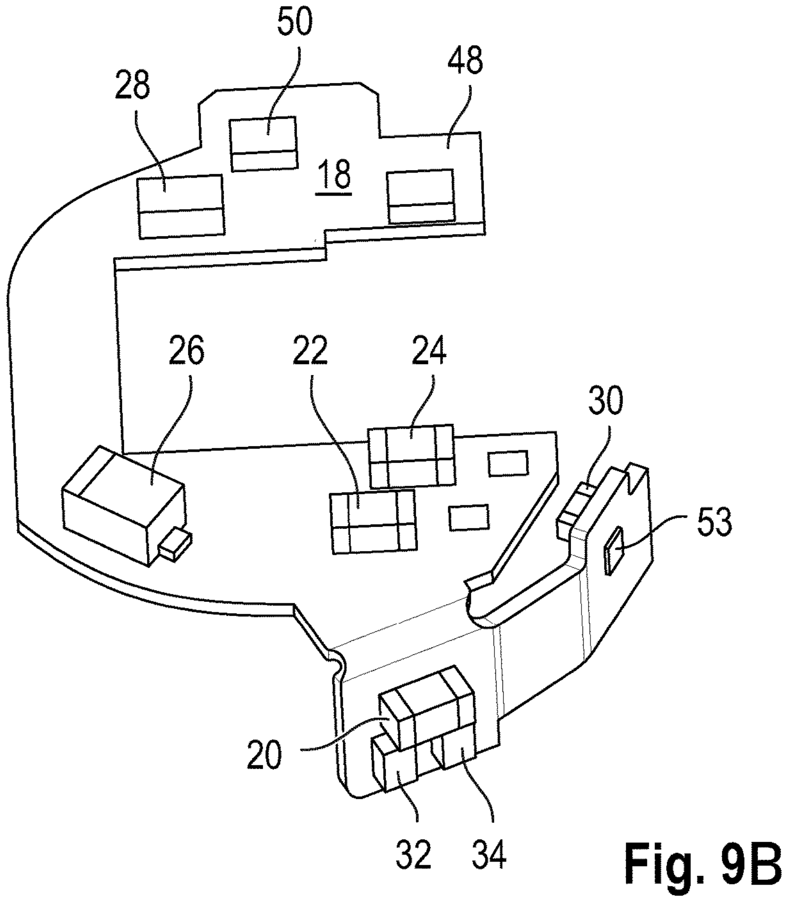
FIG. 9B is a perspective view of the flexible PCB drawing with all the SMT component placement.

The flexible printed circuit board (PCB) 18 is in particular a holder and preferably positions all the electronic components, including any surface mounted technology (SMT) components. FIG. 9A shows the schematic diagram of the PCB circuit and FIG. 9B shows the flexible PCB 18 drawing with all the SMD components in place. Apart from the mounting component, the PCB has a couple of pads, in particular terminals 48, 50, 52, 53, 54, 56, 58, and pads 32 and 34 that are used as connection terminal allowing an external wiring connection joint to the battery coil module and also allowing a battery tabs connection. An adhesive tape or glue is suitably applied to the bottom surface of the flexible PCB to tightly attach the PCB to the battery coil module. The flexible printed circuit board 18 of the battery coil module 2 contains two resonance capacitors 20, 22, a smoothing capacitor 24, a diode 26, a resettable fuse 28, and a thermistor 30. In particular, the PCB 18 comprises two major branches, one connected to the receiver coil 6 and the other connected to the secondary battery 12. The pads 32 and 34 allow to connect the receiver coil 6 to the PCB. Terminals 48, 50 are used for connecting the secondary battery 12.

The resonance capacitors 20, 22 are marked in the PCB circuit diagram in FIG. 9A as Cr1 and Cr2. The two resonance capacitors are preferably connected in parallel to the receiver coil 6, marked with Rx in the wiring diagram. The resonance capacitor is used for tuning the inductive receiver coil 6 to a target resonance frequency. Preferably there is a resonance capacitor with a larger capacity and one with a smaller capacity. The resonance capacitor 20 with the larger capacity value is preferably placed closer to the receiver coil 6 and the resonance capacitor 22 with the smaller capacity is placed further away from the receiver coil 6 as depicted in FIG. 9B. A resonance capacitor with suitably 1% capacitance tolerance is used for the enhanced design battery coil module. A diode 26 and a smoothing capacitor 24, also marked with Cs form a rectifier circuit. The rectifier circuit is used for transforming the received alternating current (AC) energy to the direct current (DC) energy. The rectifier circuit is connected to terminals 52 and 54.

The anode terminal of diode 26 is connected to the resonance capacitors 20, 22 and the receiver coil terminal pad 32. The anode terminal of diode 26 is, however, not directly connected to pad 34 because it is a ground pad. The cathode terminal of the diode is connected to the smoothing capacitor 24 and the output terminal pad. The power rating of the diode preferably is at least two times larger than the maximum received power to avoid damage in the event of excessive received power.

The voltage rating of the smoothing capacitor 24 is preferably larger than the voltage rating of the load. The smoothing capacitor connected in parallel to the output terminal pads 52, 54 is used for smoothing the fluctuating unipolar energy to a smooth DC energy. Therefore, the capacitance of the smoothing capacitor 24 is preferably chosen to be in the range of one or several hundred nF.

The thermistor 30 is used for sensing the temperature of the battery 12 while the device is charging. The main heat generation source of the battery coil module is the receiver coil 6, distributing over the ferrite sheet 8. Hence, the thermistor 30 is preferably located close to the ferrite sheet 8 and receiver coil 6. It is also preferably placed facing the battery 12 to accurately sense the battery temperature at the charging state. Close to the thermistor and in series with the thermistor the terminal 53 is located.

The resettable fuse 28 is used for preventing a sudden short circuit happening with a high current flow through and for restoring to normal condition after the short circuit resolves after a certain period. The resettable fuse 28 is preferably connected in series to the output of the battery positive terminal connector 48. Terminals 56 and 58 are the output and input pads in the branch of the secondary battery 12.

All the pads in the flexible PCB are used as the external connection terminal as described above. Except for the pad connector, the whole enhanced design battery coil module surface is preferably coated with an insulation layer, such as Parylene coating, to prevent a short circuit happening to the battery positive surface and negative surface.

A few tests have been carried out to verify the assumptions made above. The first test is carried out to compare the quality factor of a non-magnetized negative tab and a magnetized negative tab. The second test is carried out to compare the battery temperature difference at the charging state of a two winding turns and three winding turns enhanced design battery coil module. The third test is carried out to check the inductance distribution of the enhanced design battery coil module. The fourth test is carried out to check the resonance frequency distribution of the enhanced design battery coil module. The fifth test is carried out to test the resettable fuse protection feature in the battery coil module. The sixth test is carried out using simulation drawing to check the dimension of the invented enhanced design battery coil module compared with the previous battery coil module design shown in published, non-prosecuted German patent application DE 10 2020 205 157 A1.

Quality Factor of Magnetized Tab Versus Non-Magnetized Tab

Figure 10:
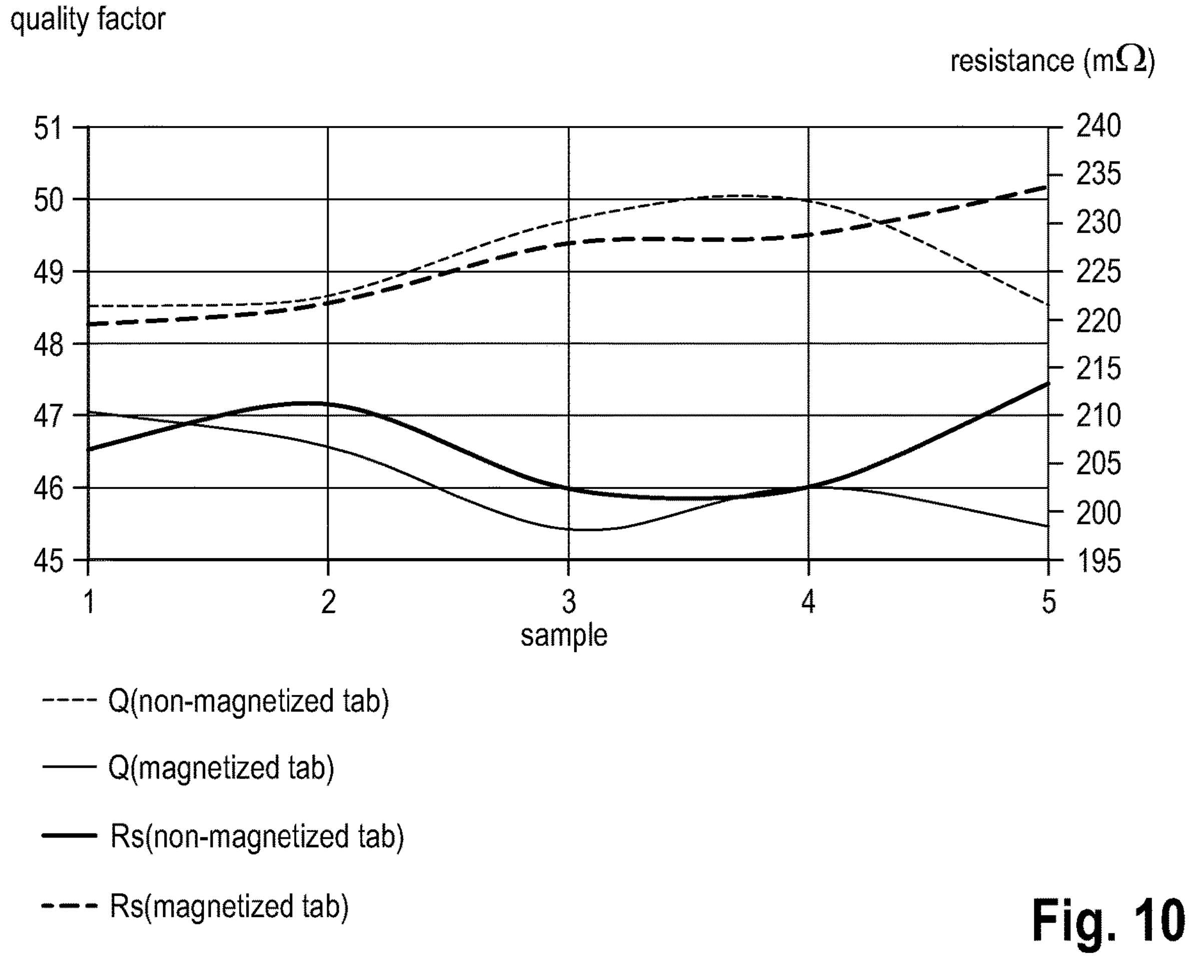
FIG. 10 is a graph showing a quality factor and resistance of magnetized tabs and non-magnetized tabs.

A few samples of two winding turns enhanced battery coil module samples are used for comparing the non-magnetized tab and magnetized tab. Table 1 below shows the measurement result of the non-magnetized negative tab and magnetized negative tab. FIG. 10 shows the quality factor and resistance of magnetized tabs and non-magnetized tabs. The overall inductance of the magnetized negative tab is slightly higher than the non-magnetized negative tab. However, the overall resistance of the magnetized tab is higher than the non-magnetized tab in the 10 mΩ range. As such, the overall quality factor of the non-magnetized negative tab is higher than the magnetized negative tab. This measurement verifies the non-magnetized tab effectively enhances the quality factor by lowering the resistance significantly.

TABLE 1

| Measurement result of the non-magnetized negative tab and magnetized negative tab | | | | |
|---|---|---|---|---|
| Feature | sample | Ls(nH) | Q | Rs(mΩ) |
| Non-magnetized tabs | 1 | 118.01 | 48.535 | 206.83 |
| | 2 | 120.94 | 48.666 | 211.39 |
| | 3 | 118.08 | 49.692 | 202.54 |
| | 4 | 118.94 | 49.956 | 202.73 |
| | 5 | 121.51 | 48.533 | 213.37 |
| Magnetized tabs | 1 | 121.55 | 47.064 | 219.66 |
| | 2 | 121.56 | 46.589 | 221.67 |
| | 3 | 121.54 | 45.447 | 227.85 |
| | 4 | 124.06 | 46.017 | 228.61 |
| | 5 | 124.25 | 45.487 | 233.52 |

Temperature Measurement for a Two Winding Turns Coil and a Three Winding Turns Coil A device using two turns battery coil module and a device using three turns battery coil is carried out to compare the inductance and quality factor. The inductance of the two winding turns battery coil module is 120.94 nH and the three winding turn battery coil module is 238.20 nH. The quality factor is almost the same for the battery coil module in two winding turns receiver coil and three winding turns receiver coil which is about 48 to 50. This result is due to the resistance of the three winding turns receiver coil is larger regardless that it has a higher coil inductance. A test is also conducted to compare the charging temperature of two winding turns and three winding turns receiver coil battery coil module. Table 2 below shows the inductance measurement result and the hearing instrument charging temperature. The inductance of three turns battery coil module is almost two times larger than two turns battery coil module. The maximum charging temperature of two winding turns and three winding turns enhanced battery coil module is 48.2° C. and 44.8° C. respectively. The charging curve result shows the three winding turns battery module has an overall 3-5° C. charging temperature lower than the two turns battery module.

TABLE 2

Figure 11A:
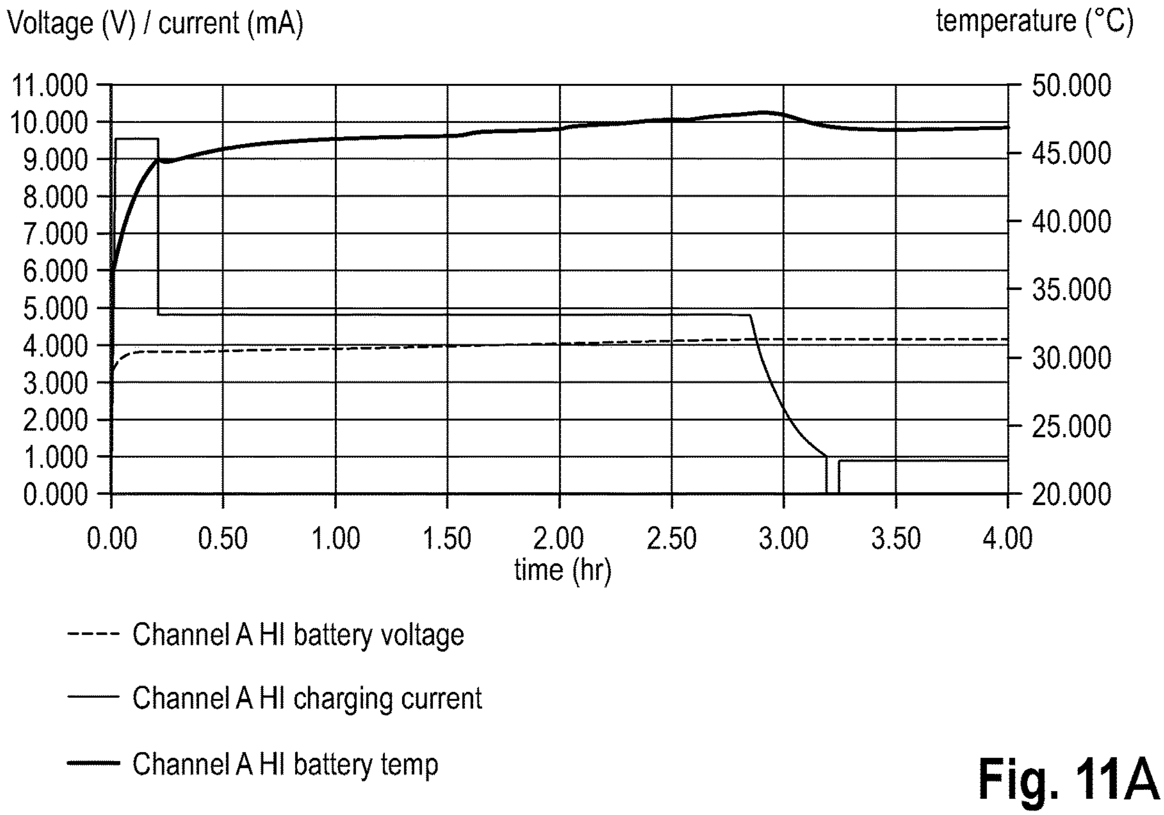
FIG. 11A is a graph of a Charging Curve and a Temperature Curve—Two winding turns.
Figure 11B:
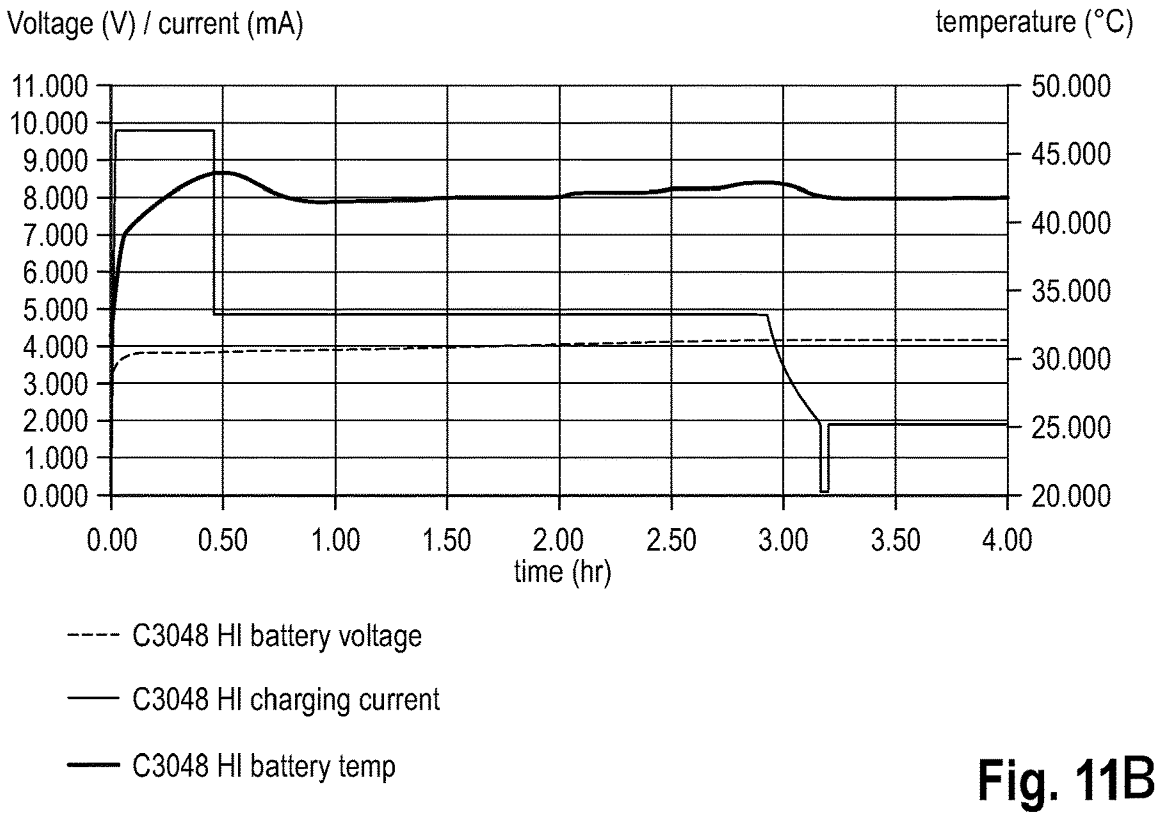
FIG. 11B is a graph of the Charging Curve and the Temperature Curve—Three winding turns.

| Inductance measurement and the HI charging temperature | | | |
|---|---|---|---|
| Battery coil module Winding Turns | Ls (nH) | Charging Curve and Temperature Curve at 30° C. ambient temperature | Maximum Charging Temperature (° C.) |
| Two winding turns | 120.94 | cf. FIG. 11A | 48.2 |
| Three winding turns | 238.20 | cf. FIG. 11B | 44.8 |

Inductance Distribution of Enhanced Design Battery Coil Module

Figure 12:
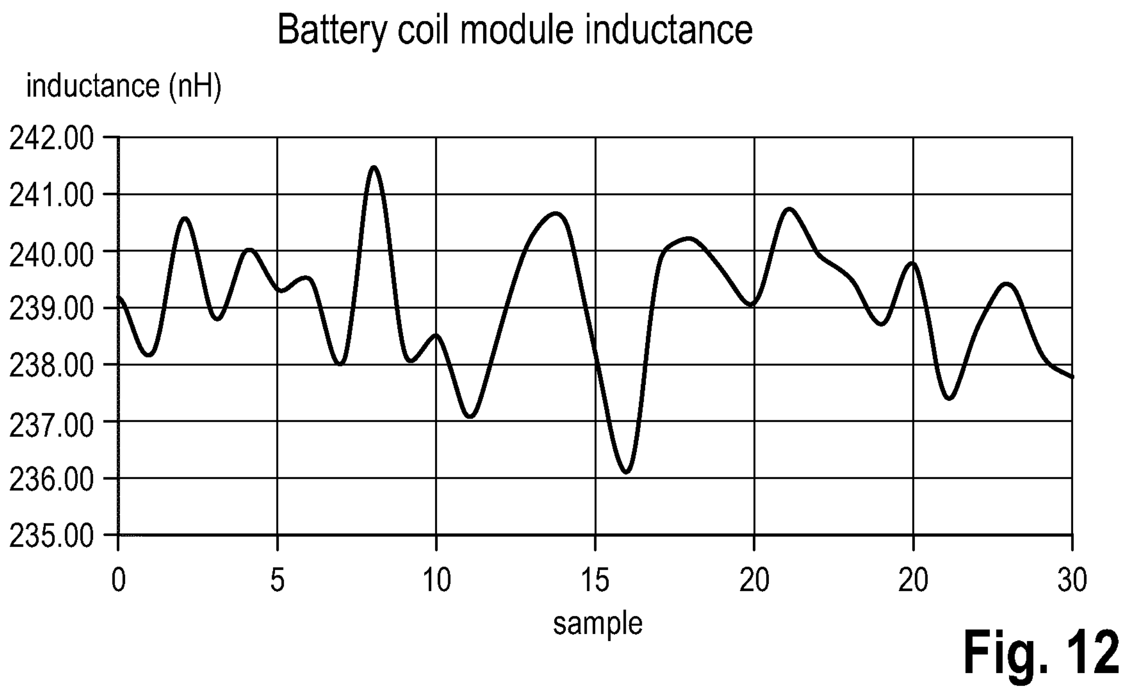
FIG. 12 is a graph showing an inductance measurement of 31 pieces of enhanced design battery coil modules.
Figure 13:
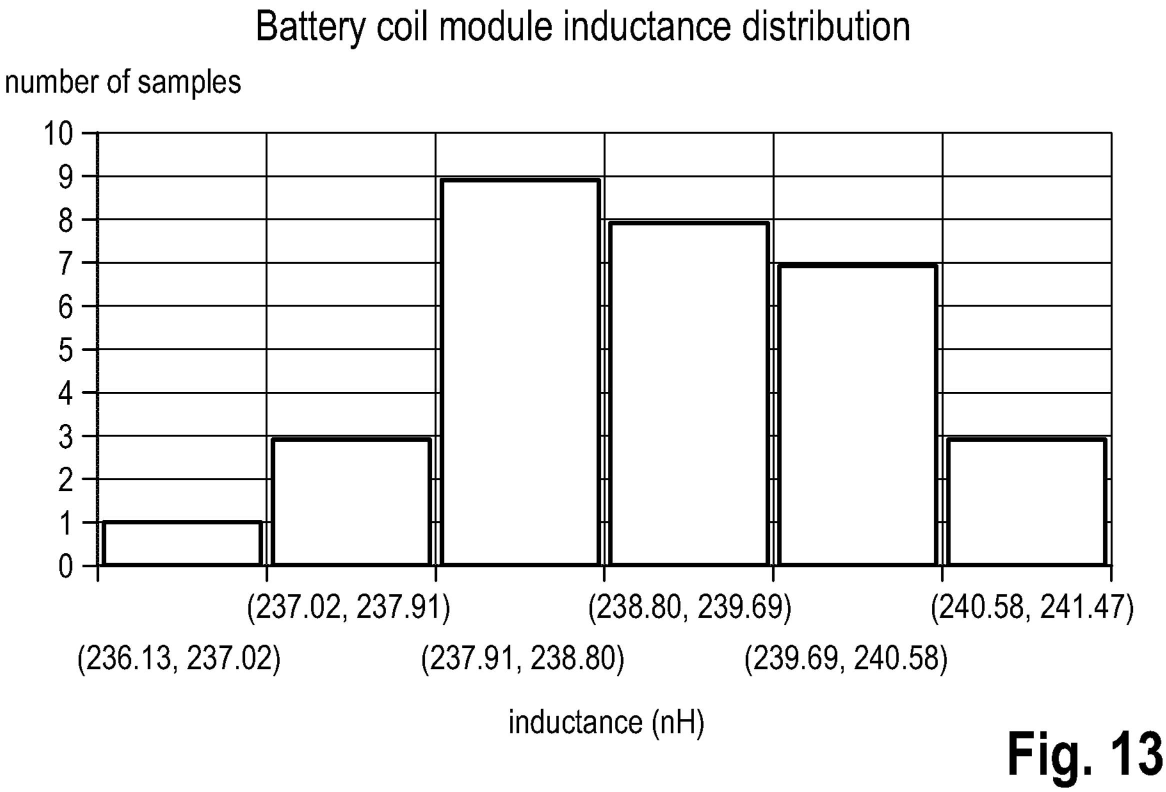
FIG. 13 is a bar chart being an inductance distribution chart of 31 pieces of the enhanced design battery coil modules.

The inductance measurement is conducted for 31 handmade pieces (or samples) of the enhanced design battery coil module presented here. FIG. 12 shows the inductance measurement for these 31 pieces of enhanced design battery coil module. Among these 31 battery coil modules, the maximum inductance is 241.47 nH and the minimum inductance is 236.13 nH. FIG. 13 shows the inductance distribution chart of the 31 enhanced design battery coil module samples. The distribution chart shows the center inductance value of the battery coil module is 288.80 nH and the inductance tolerance value is +2.67 nH. This small inductance tolerance result verifies the introduced plastic ring module effectively controls the inductance tolerance of the battery coil module.

Resonance Frequency Distribution of Battery Coil Module

Figure 14:
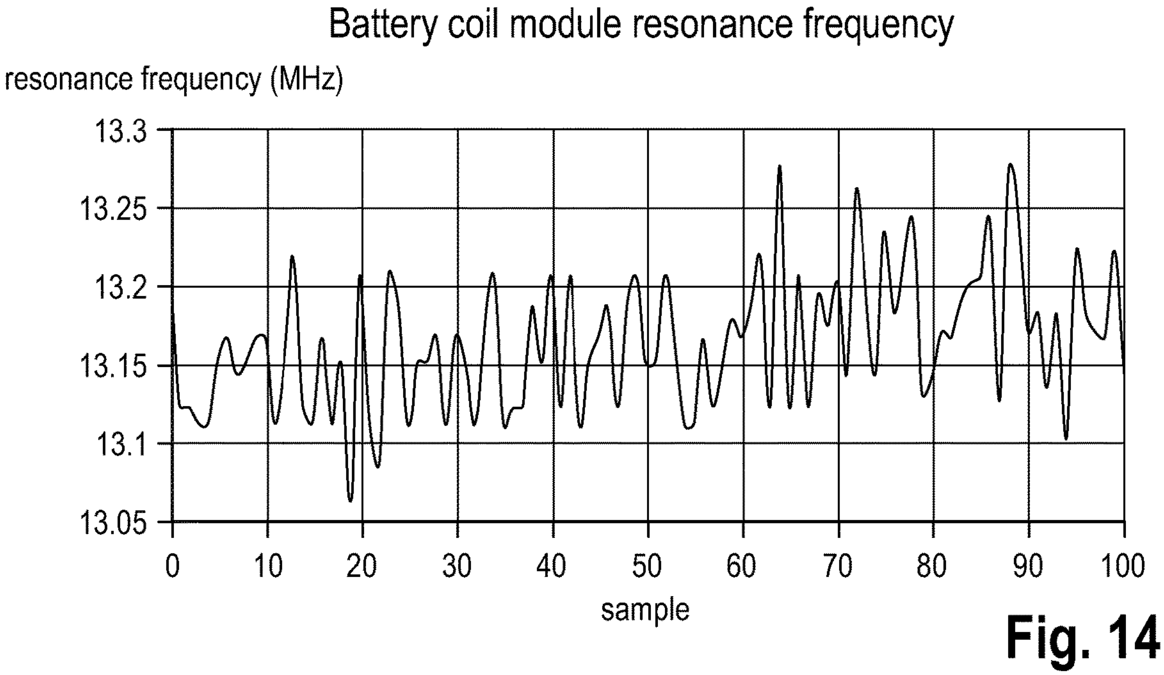
FIG. 14 is a graph showing a resonance frequency measurement of 101 enhanced design battery coil module samples.
Figure 15:
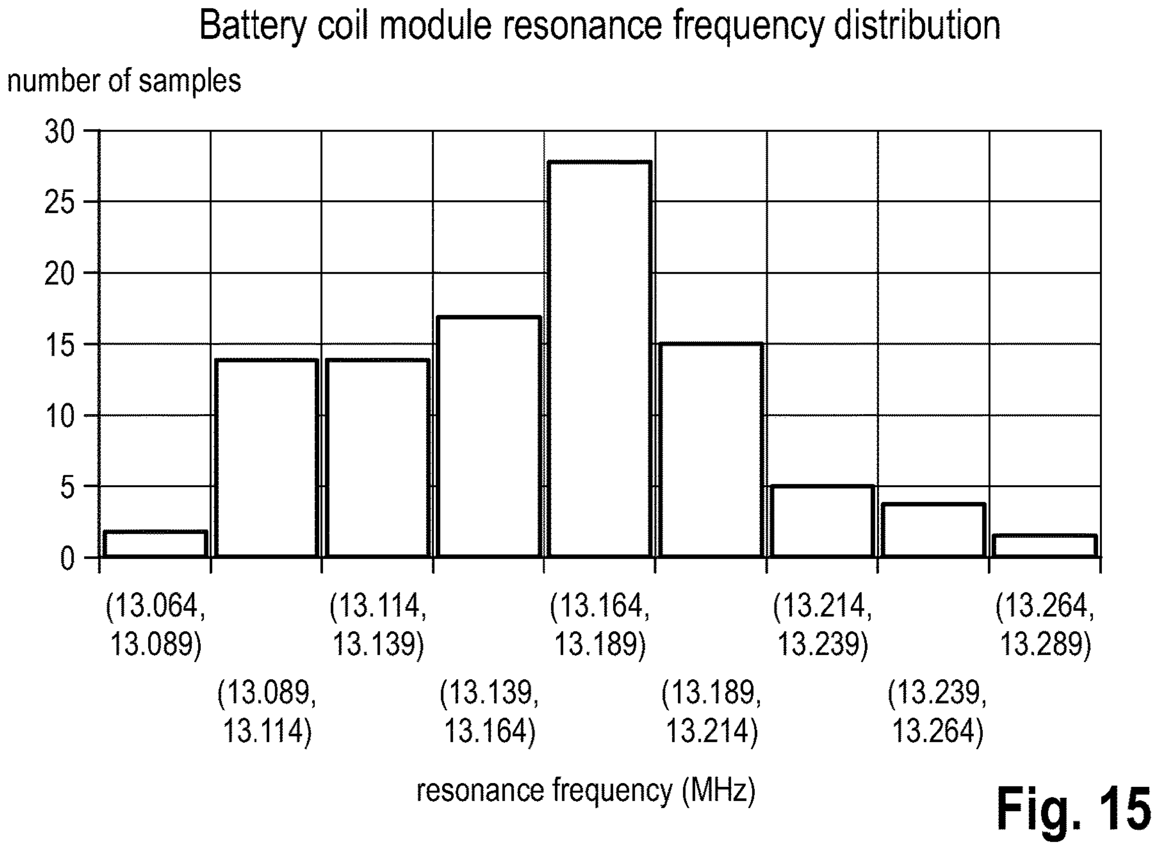
FIG. 15 is a resonance frequency distribution chart of 101 enhanced design battery coil module samples.

The resonance frequency measurement is conducted for 101 pieces (or samples) of the enhanced design battery coil module. The targeted resonance frequency for this enhanced design battery coil module example is 13.17 MHz. FIG. 14 shows the resonance frequency measurement of the 101 enhanced design battery coil modules. FIG. 15 shows the resonance frequency distribution chart of the 101 enhanced design battery coil module samples. The resonance frequency measurement shows the 101 battery coil modules being in the range of 13.064 MHz to 13.280 MHz. The tolerance resonance frequency of the battery coil module is about 110 kHz. This small resonance frequency tolerance result verifies the two resonance capacitors and 1% capacitance tolerance accurately tune the resonance frequency of the battery coil module and keep the resonance frequency in a small tolerance range.

Resettable Fuse Feature

Figure 16:
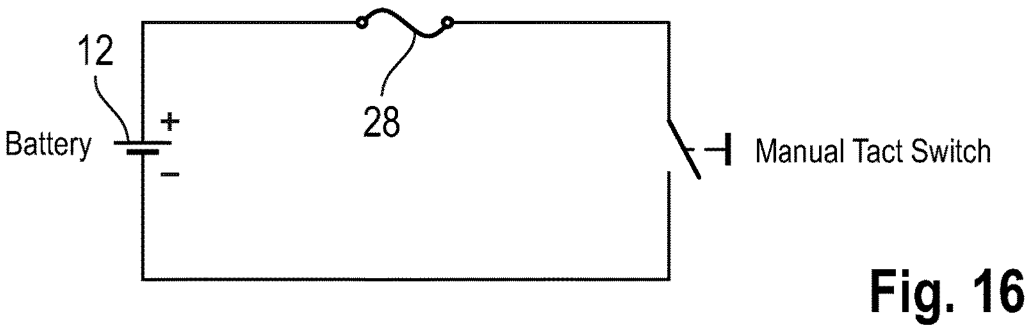
FIG. 16 is a schematic diagram of a resettable fuse test setup.
Figure 17:
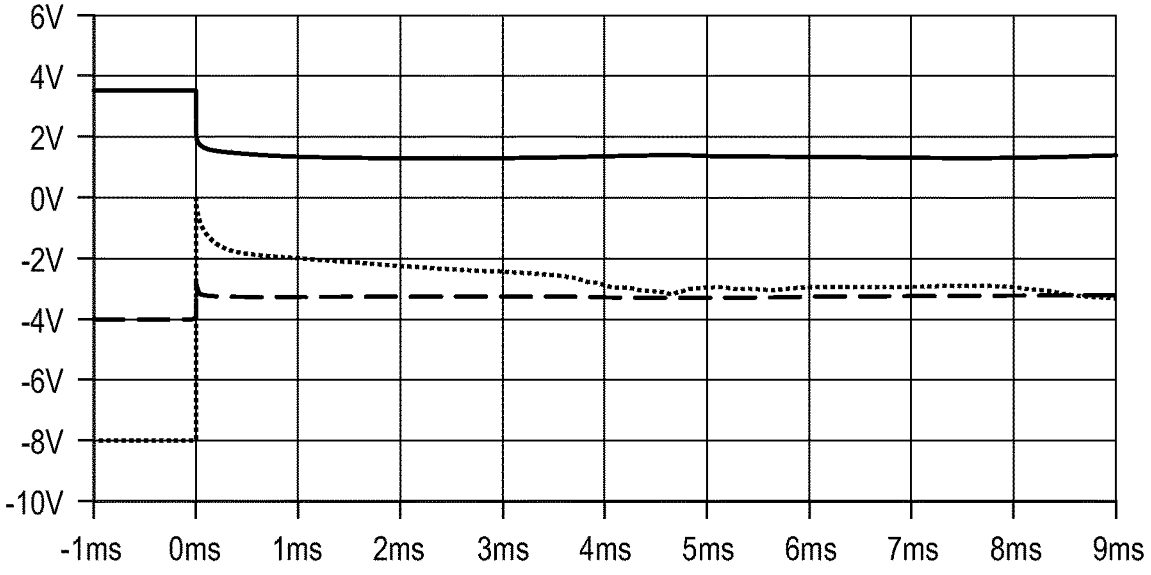
FIG. 17 is a graph showing a measurement waveform of the resettable fuse operation.

The resettable fuse has the feature of turning to a high resistance when a short circuit happened with high current flows through it. FIG. 16 shows the resettable fuse test setup with a 3.7 V battery as the source and the battery positive terminal is connected to the resettable fuse. The test is conducted by triggering a short circuit of the positive terminal and the negative terminal via pressing the manual tact switch. Then the short circuit is removed when the manual tact switch is released. The selected resettable fuse has a 200 mA rated current. FIG. 17 shows the measurement waveform of the resettable fuse operation. The solid line curve (blue) is the battery voltage, the dashed line curve (red) is the fuse voltage, and the dotted line curve (yellow) is the battery current. Before short circuit, the battery voltage is 3.7 V and the resettable fuse voltage is 0 V. The resettable fuse resistance before short is about 0.7Ω. At the instant of pressing the manual tact switch, the battery current instantly rises up to about 2 A. At the same instant, the battery voltage drop to half and the voltage drop of resettable fuse change to a significant higher voltage, in particular to almost equal the battery voltage. Then, the battery current slowly declined down to a small value, which implies the reaction of the resettable fuse changes its resistance to an extremely high value to restrict the current flow. After one hour and the short removed, the resistance of the resettable fuse changed to 0.8Ω. This measurement result verifies that the resettable fuse effectively reacts to the short circuit at the downstream circuit in a short moment.

Mechanical Dimension Comparison

A mechanical simulation drawing is carried out to compare the dimension of the enhanced battery coil module presented here and the previous design battery coil module. The dimension of soft ferrite flexible PCB coil module and hard ferrite molded copper coil module are shown in published, non-prosecuted German patent application DE 10 2020 205 157 A1. Table 3 below shows the comparison table of the enhanced design battery coil module versus the previous design battery coil module. For the front dimension, all kinds of battery coil module designs have an almost similar diameter and almost the same length from edge to edge. However, the enhanced battery coil module presented in the present application has a shorter side edge to edge and slightly smaller thickness when looking from the side dimension. This dimensions measurement verifies that the enhanced design battery coil module presented here is smaller than the previous design battery coil module.

TABLE 3

Comparison table of the enhanced design battery coil module versus previous design battery coil module:

| | Soft ferrite flexible PCB coil module | Hard ferrite molded copper coil module | Invented enhance battery coil module |
|---|---|---|---|
| Maximum diameter length | 10.30 mm | 10.20 mm | 10.35 mm |
| Maximum height | 13.01 mm | 12.93 mm | 9.6 mm |

Figure 18:
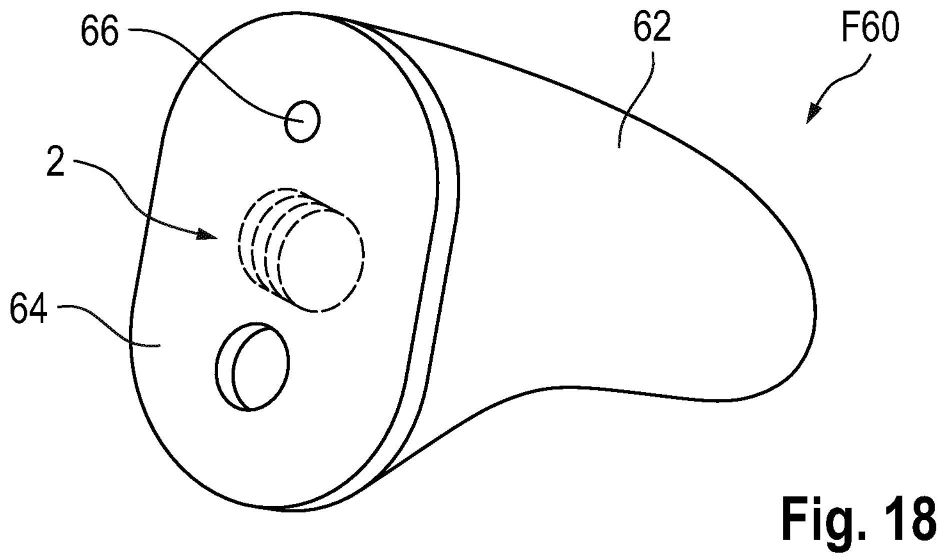
FIG. 18 is a perspective view of a hearing instrument.

FIG. 18 shows a hearing instrument 60 with a battery coil module 2. The hearing instrument 60 is provided with a casing 62. In this embodiment the casing is dedicated to be inserted into an ear. For closing, the casing 62 it is provided with a face plate 64. The face plate includes an opening or insert for a microphone 66. The battery coil module 2 is integrated to the hearing instrument 60.

The features and embodiments described in this application and in connection with the figures are not restricted to the specific combinations and values as described and shown therein. Rather, further advantageous embodiments of the invention result from omitting some features and/or from different combinations of the mentioned features and/or by selecting different values.

The following is a summary list of reference numerals and the corresponding structure used in the above description of the invention.

REFERENCE SIGNS

2 battery coil module
4 module ring
6 coil
8 ferrite sheet
10 copper sheet
12 secondary battery
14 battery tab
16 battery tab
18 printed circuit board
20 resonance capacitor
22 resonance capacitor
24 smoothing capacitor
26 diode
28 fuse
30 thermistor
32 pad
34 pad
36 protruded portion
38 adhesive tape
40 first flat surface
42 second flat surface
44 circumferential surface
46 insolation tape
48 . . . 58 terminal
60 hearing instrument
62 casing
64 face plate
66 microphone opening

The invention claimed is:

1. A battery coil module, comprising:

two battery polarity terminals for contacting battery poles of a secondary battery;

a fuse;

a ferrite element being a flexible ferrite sheet having a protruded portion;

a receiver coil;

a resonance capacitor;

a temperature sensor for sensing a temperature close to the secondary battery; and a module ring having a shape of a hollow circle and/or is made of a plastic material that does not contain any magnetizing composition, said protruded portion of said flexible ferrite sheet forming a form-locking connection with said module ring.

2. A battery coil module, comprising:

two battery polarity terminals for contacting battery poles of a secondary battery;

a fuse;

a receiver coil;

a resonance capacitor;

a temperature sensor for sensing a temperature close to the secondary battery;

a module ring;

a copper sheet; and a flexible ferrite sheet, wherein said flexible ferrite sheet encompasses an outer surface of said copper sheet and/or said flexible ferrite sheet has an adhesive tape applied to said flexible ferrite sheet for attaching to said outer surface of said copper sheet.

3. The battery coil module according to claim 1, wherein said receiver coil has a three winding turns receiver coil.

4. The battery coil module according to claim 1, further comprising a copper sheet.

5. The battery coil module according to claim 2, wherein said flexible ferrite sheet has a protruded portion forming a form-locking connection with said module ring.

6. The battery coil module according to claim 2, wherein said module ring has a shape of a hollow circle and/or is made of a plastic material that does not contain any magnetizing composition.

7. The battery coil module according to claim 1, further comprising a coin cell battery and/or battery tabs.

8. The battery coil module according to claim 1, wherein said fuse is a resettable fuse.

9. The battery coil module according to claim 1, further comprising a first and a second resonance capacitor.

10. The battery coil module according to claim 1, wherein the battery coil module is configured for a hearing instrument.

11. The battery coil module according to claim 3, wherein said three winding turns receiver coil is made from a copper material.

12. The battery coil module according to claim 4, wherein said copper sheet surrounds a battery circumferential surface.

13. The battery coil module according to claim 1, wherein said module ring has a recess or opening formed therein, said protruded portion of said flexible ferrite sheet forming a form-locking connection with said recess or said opening of said module ring.

14. A hearing instrument, comprising:

said battery coil module according to claim 1.

15. The hearing instrument according to claim 14, wherein the hearing instrument is a hearing aid.

16. A method for manufacturing a battery coil module, which comprises the step of:

building the battery coil module according to claim 1.

* * * * *